Aug. 21, 1951 L. M. POTTS 2,565,266

HIGH-SPEED PHOTOELECTRIC TRANSMITTER

Filed June 20, 1947 5 Sheets-Sheet 1

*INVENTOR.*

LOUIS M. POTTS, DECEASED

MARTHA W. C. POTTS, EXECUTRIX

BY Emery Robinson

ATTORNEY

Aug. 21, 1951 L. M. POTTS 2,565,266

HIGH-SPEED PHOTOELECTRIC TRANSMITTER

Filed June 20, 1947 5 Sheets-Sheet 2

INVENTOR.

LOUIS M. POTTS, DECEASED

MARTHA W. C. POTTS, EXECUTRIX

BY Emery Robinson

ATTORNEY

HIGH-SPEED PHOTOELECTRIC TRANSMITTER

Filed June 20, 1947 5 Sheets-Sheet 3

INVENTOR.
LOUIS M. POTTS, DECEASED
MARTHA W. C. POTTS, EXECUTRIX
BY Emery Robinson
ATTORNEY Aug. 21, 1951 L. M. POTTS 2,565,266

HIGH-SPEED PHOTOELECTRIC TRANSMITTER

Filed June 20, 1947 5 Sheets-Sheet 4

INVENTOR.
LOUIS M. POTTS, DECEASED
MARTHA W. C. POTTS, EXECUTRIX
BY Emery Robinson
ATTORNEY

HIGH-SPEED PHOTOELECTRIC TRANSMITTER

Filed June 20, 1947

5 Sheets-Sheet 5

INVENTOR.
LOUIS M. POTTS, DECEASED
MARTHA W. C. POTTS, EXECUTRIX
BY Emery Robinson
ATTORNEY Patented Aug. 21, 1951 2,565,266

UNITED STATES PATENT OFFICE 2,565,266

HIGH-SPEED PHOTOELECTRIC TRANSMITTER

Louis M. Potts, deceased, late of Evanston, Ill., by Martha W. C. Potts, executrix, Evanston, Ill., assignor to Teletype Corporation, Chicago, Ill., a corporation of Delaware Application June 20, 1947, Serial No. 755,855

15 Claims. (Cl. 178—17)

The present invention relate to telegraph transmitting apparatus, and more particularly to telegraph transmitters of the photoelectric variety.

In previously telegraph transmitters of this type it has been the custom to provide scanning drums for interpreting the code signals which makes necessary the synchronizing of the record bearing the code signals and feed marks and the rotation of the drums. Such a transmitter has been devised successfully, as exemplified in United States Patent No. 2,397,202, issued on March 26, 1947, to L. M. Potts. However, the addition of synchronization equipment necessarily increases the amount of parts, the number of moving elements, and the resultant cost of construction of the apparatus.

Accordingly, a primary object of the present invention is to provide a photoelectric transmitter which operates continuously, the feed of the record indicia determining whether the transmitter operates idly or transmits signals, such feed being automatic.

A second object of the present invention is to provide such a transmitter for transmitting code signals of the simplex (start-stop) variety.

Another object of the invention is to provide a photoelectric transmitter having as few moving parts as possible and subject to low cost of construction.

A further object of the invention is to provide a start-stop photoelectric telegraph transmitter provided with a continuous motion, the indicia record only having a start-stop movement.

A still further object of the present invention is to provide a start-stop photoelectric transmitter utilizing a single photocell only.

Another object of the invention is to provide photoelectric transmitters operating from reflected light.

Yet another object of the invention is to provide a single photocell start-stop transmitter, the single photocell controlling both signal transmission and indicia record advancement.

A still further object of the present invention is to provide a start-stop photoelectric transmitter wherein the indicia record is advanced during the stop impulse interval only when the consecutive characters have a normal spacing, but wherein advancement occurs during any portion of the transmission cycle when consecutive characters are abnormally far apart.

Another object of the present invention is to provide a photoelectric telegraph transmitter wherein the scanning occurs while the indicia record is stationary.

In general, the photoelectric transmitter comprises a constantly rotating scanning disc, a light source and light reflecting mechanism, an indicia record having both signal and feed control code indicia, and means to advance the indicia record intermittently, the code scanning occurring during stationary conditions of the record.

The embodiment of such a transmitter provides a single photocell start-stop code signal transmitter, the single photocell controlling both signal transmission and indicia record advancement.

While specific objects of the invention and a brief general description of the apparatus has been given above, a more complete understanding thereof may be had by reference to the following detailed description when taken in conjunction with the accompanying drawings, in which.

Figure 4:
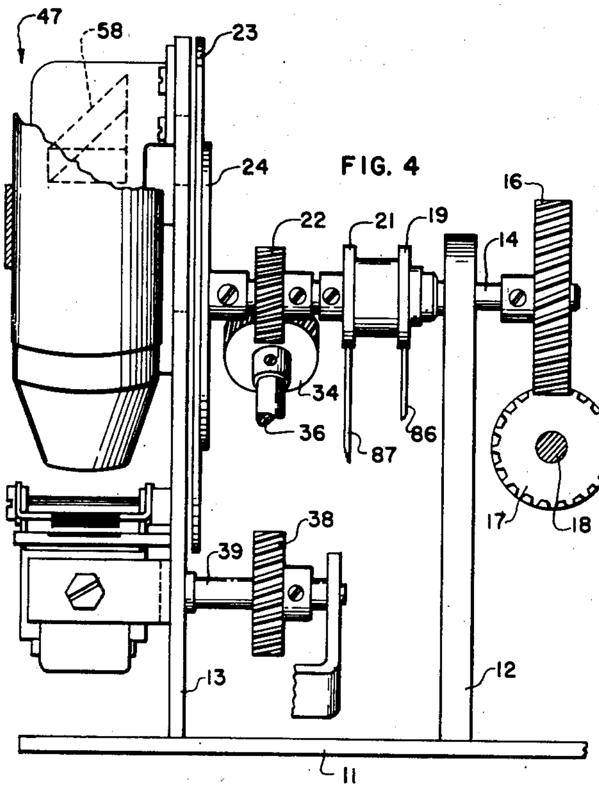
Fig. 4 is a side view of the transmitter shown in Fig 1.

Referring now specifically to Figs. 1 to 4, inclusive, the mechanical elements of the start-stop photoelectric transmitter may be seen more in detail, certain unnecessary elements such as brackets, etc., being eliminated in order to simplify the understanding of the apparatus. With reference to Fig. 4 it may be seen that the apparatus comprises a base portion 11 to which are secured at right angles a vertically extending bearing bracket 12 and a plate 13. The bearing bracket 12 supports suitably a shaft 14 which has a gear 16 fastened securely to its rightward extremity. The gear 16 meshes with a companion gear 17 fastened securely to a shaft 18 which is connected to a motor drive. Thus, the continuously operating motor (not shown) imparts continuous rotation to its shaft 18, the gear 17, the meshing gear 16, and to the shaft 14.

The shaft 14 is also provided with a pair of cams 19 and 21, the function of which will be described more in detail later, a gear 22 and at the leftward extremity with a scanning disc 23 which is connected to rotate with the shaft 14 through a connecting plate 24.

Figure 2:
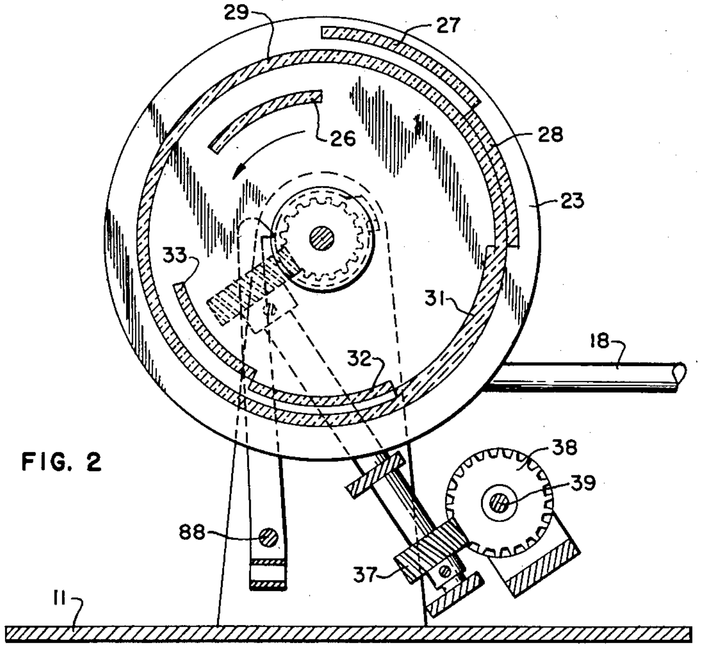
Fig. 2 is a rear elevational view of the transmitter shown in Fig. 1, certain of the parts only being illustrated.
Figure 3:
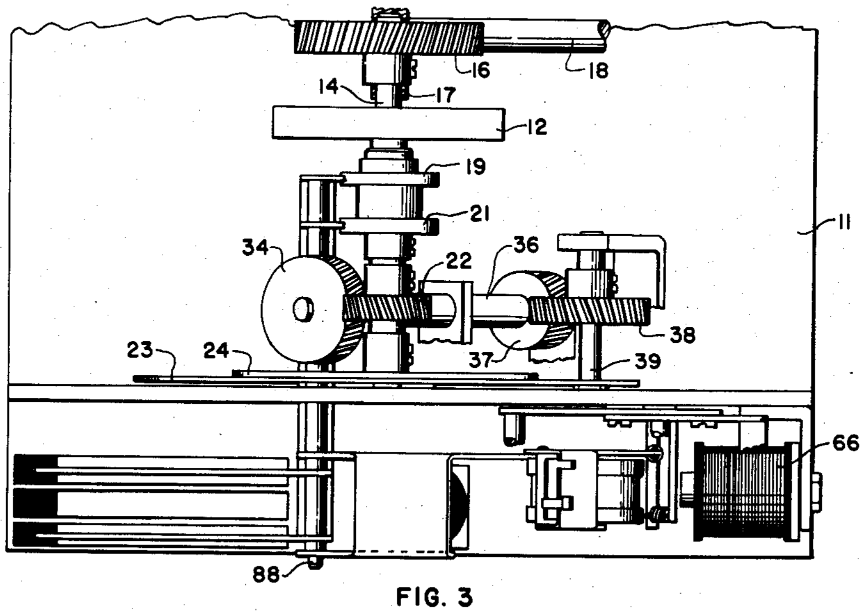
Fig. 3 is a top view of the transmitter shown in Fig. 1.

The scanning disc 23 may be more readily understood by reference to Fig. 2 wherein it is illustrated as a solid disc having transparent or cutout portions. The cutout portions are utilized for the scanning of an indicia record and in the use of the well known Baudot five unit code with added stop and start intervals. The disc 23 is provided with a start impulse scanning portion 26, a No. 1 impulse scanning portion 27, a No. 2 impulse scanning portion 28, a feed scanning portion 29, a No. 3 impulse scanning portion 31, a No. 4 impulse scanning portion 32, and a No. 5 impulse scanning portion 33.

As mentioned previously, the enumerated scanning portions are transparent or openings in the disc 23 with the feed scanning portion 29 being continuous through the 360° of the disc, whereas the remaining scanning portions are each approximately 1/7 angular distance of the disc. It is to be noted that for practical or manufacturing purposes it would appear to be preferable to make the various scanning portions of the disc 23 of transparent material.

As was previously mentioned with respect to Fig. 4, a gear 22 is provided on the shaft 14 for continuous rotation with the shaft. The gear 22 meshes with a gear 34 which is fastened securely to a suitably journaled shaft 36 which is provided near its opposite extremity with a gear 37, Figs. 2 and 3. The gear 37 meshes with a gear 38 which is provided near the extremity of a suitably journaled shaft 39 to which it imparts continuous rotation. Secured to the opposite extremity of the shaft 39 is a continuously rotating tape advancing roll 41, as illustrated most clearly in Figs. 1, 5, and 6.

It may be seen from the description above that all of the moving elements so far described are continuously rotating, which include the scanning disc 23 and the tape advancing roll 41. It might be mentioned at this point that the tape will not be advanced continuously even though the roll 41 rotates continuously, for a reason which will be described and become apparent hereinafter.

Figure 1:
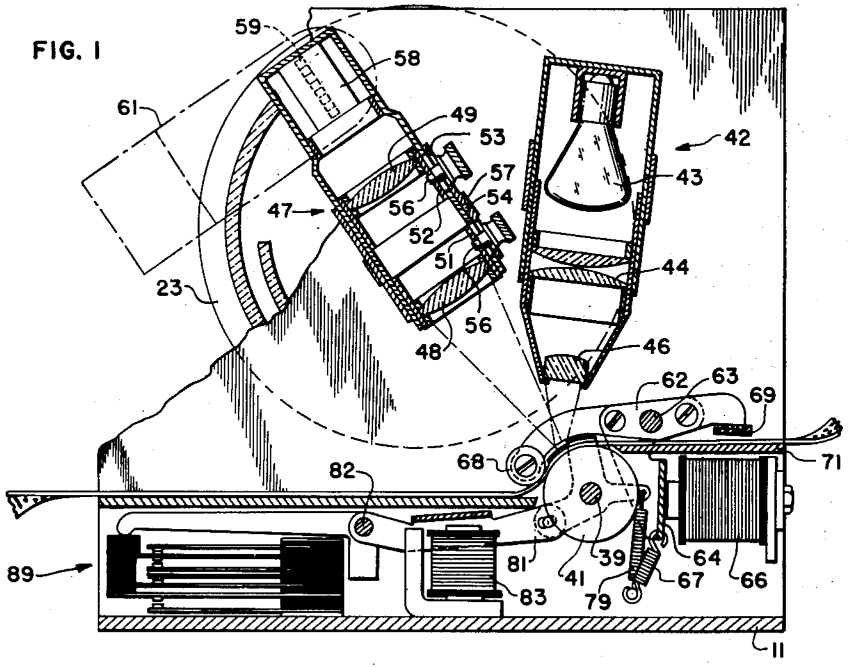
Fig. 1 is a front elevational view of a start-stop transmitter, partly in cross section, with certain portions broken away.

Referring now to Fig. 1, it may be seen that a light source indicated generally by the numeral 42 is provided above the tape feed roll 41 and which includes a light bulb 43, a condensing lens 44, and a cylindrical lens 46 so arranged that light from the source 43 will be concentrated on the tape feed roll 41 or tape passing thereover at a scanning point which is a transverse line of relatively small width, the entire width of the tape when in position. It should be noted that the light at the scanning point should be of sufficient width so that the code marks on the tape to the extent of at least one character are illuminated. It should also be noted that the light source 42 is made adjustable in order that the illumination at the scanning point may be focused to a desired sharpness. It is, of course, obvious that the various outer elements of the light source 42 should be lighttight. The light source may be either an incandescent bulb energized from a direct current source, or a stroboscopic tube of high brilliancy energized by a high audible frequency source for tone transmission through the photoelectric and amplifier system, for operation per Fig. 12.

With reference now to Figs. 1 and 4, it may be seen, particularly in Fig. 1, that the light reflected from the tape or feed roll 41 will be directed to an optical arrangement indicated generally by the numeral 47, which is also lighttight. The optical arrangement includes a pair of lenses 48 and 49 which preferably form a photographic lens of the rectilinear type. The lenses are mounted in movable rings 51 and 52, respectively. A rotatable ring 53 is provided outside of the two rings just described which is held from axial motion by a pin 54 in a groove in the optical arrangement 47. The rings 51 and 52 carry pins 56 which fit into sloping slots in the ring 53. As a result of the arrangement just described, when the ring 53 is moved by its outer knurled portion 57, the lenses 48 and 49 are moved equal amounts in an axial direction for focusing purposes.

Also provided in the optical arrangement 47 and near the top thereof is a prism 58 which is provided to receive light from the lens 48 and 49 and reflect it at right angles as may be understood by reference to Fig. 4. The movement which may be imparted to the lens 48 and 49 described above is utilized in order that a sharp image may be thrown on the prism 58, the focal distance being changed by movement of the lens. Thus, the image cast to and by the prism 58 may remain constant.

As previously mentioned a plate 13 is provided adjacent the scanning dsc 23 to which the optical arrangement 47 is secured. The plate 13 is provided with a narrow slot 59 which is aligned with the focal plane of the reflecting prism 58 and will follow a portion of a radius of the disc 23. The slot 59 is preferably formed with sloping sides and if desired may be separated into seven equal portions so that the reflected light from the prism 58 will sharply focus on the scanning disc 23.

Secured firmly on the opposite side of the scanning disc 23 from the plate 13 is a photocell 61, Fig. 1, which is preferably of the multiplier type, which as is well known in the art, comprises a plurality of internal elements so that there is a relatively large output of the tube from a small amount of light.

Immediately above the tape feed roll 41 is a lever 62 which is mounted pivotally on a shaft 63 which, in turn, is journaled in some suitable manner, not shown. The lever 62 has a downwardly extending portion 64 which serves as the armature of a magnet 66 and which is normally biased in a clockwise direction by a spring 67 when the magnet is not energized. The lever 62 is formed, Fig. 1, with a leftwardly extending portion which terminates in a pressure roll 68, such that when the magnet 66 is energized and the lever 62 thus rotated in a counterclockwise direction, the pressure roll 68 will engage the constantly rotating roll 41 thus allowing a tape or record form to be advanced therebetween. The opposite extremity of the lever 62, Fig. 1, is provided with a brake portion or brake shoe 69 which is provided so that when the magnet 66 is not energized and the spring 67 urges the lever 62 in its normal clockwise direction the brake shoe 69 will engage the record form or tape against a plate 71 and thus prevent further advancement thereof.

Thus, it may be seen from the above, and as was previously mentioned, that despite the fact that the tape feed roll 41 is rotating continuously the only time that the tape or record form passing thereover will be advanced is when the pressure roll 68 is brought in engagement with the feed roll 41 through the counterclockwise rotation of the lever 62 under the control of the magnet 66.

Figure 5:
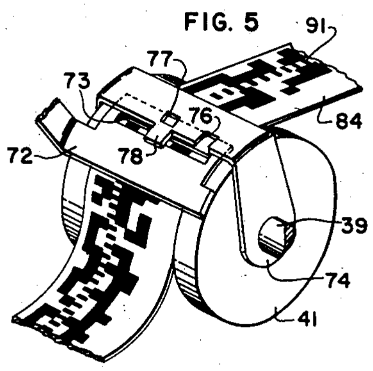
Fig. 5 is a detailed view of a light shield and shutter utilized in the invention.
Figure 6:
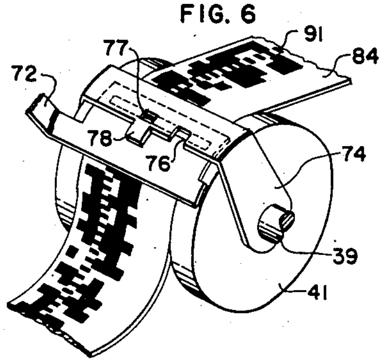
Fig. 6 is a view similar to Fig. 5 showing a different operating position of the elements.

Referring to Figs. 5 and 6, it may be seen that closely adjacent the feed roll 41 there is provided a shield 72 which is held in place by some suitable means as close to the roll 41 as possible but not in engagement therewith. The shield 72 is provided with a transverse slot 73 as may be seen most clearly in Fig. 5. The inclusion of the light shield 72 with its traversely extending slot 73, the slot corresponding to the point at which the light source 42 directs the light beam against the feed roll 41, is to limit the extent or width of light which will be reflected from the feed roll 41 or the tape passing thereover. It might be noted, however, that the light shield 72 is not absolutely necessary for successful operation of the apparatus because of the slot 59 having angular sides being formed in the plate 13, as previously mentioned. Thus, the latter will result in the proper width light being reflected to the scanning disc 23 and thus under this condition the light shield 72 may be omitted completely if desired.

Also with reference to Figs. 5 and 6, it may be seen that a shutter 74 is mounted adjacent the light shield 72, if used, or otherwise as close to the tape on the feed roll 41 as possible, in such a manner as to receive small rotational movement. The shutter 74 extends across the entire width of the feed roll 41 and is provided with a notch 76, a square cutout portion 77, and an extending lug 78. The utility of the shutter 74 and its various openings and lug will be described more fully hereinafter. The shutter 74 is provided with a spring 79, Fig. 1, which tends normally to rotate the shutter in a clockwise direction, which is comparable to the position shown in Fig. 5. The shutter 74 is also provided with an operating lever 81 which is mounted pivotally at 82 and which also serves as the armature of a magnet 83. Thus, at such time as the magnet 83 is energized the lever 81 will be rotated in a clockwise direction causing counterclockwise rotation to be imparted to the shutter 74, moving it to an operated position such as is illustrated in Fig. 6.

Figures 7, 8, 11:
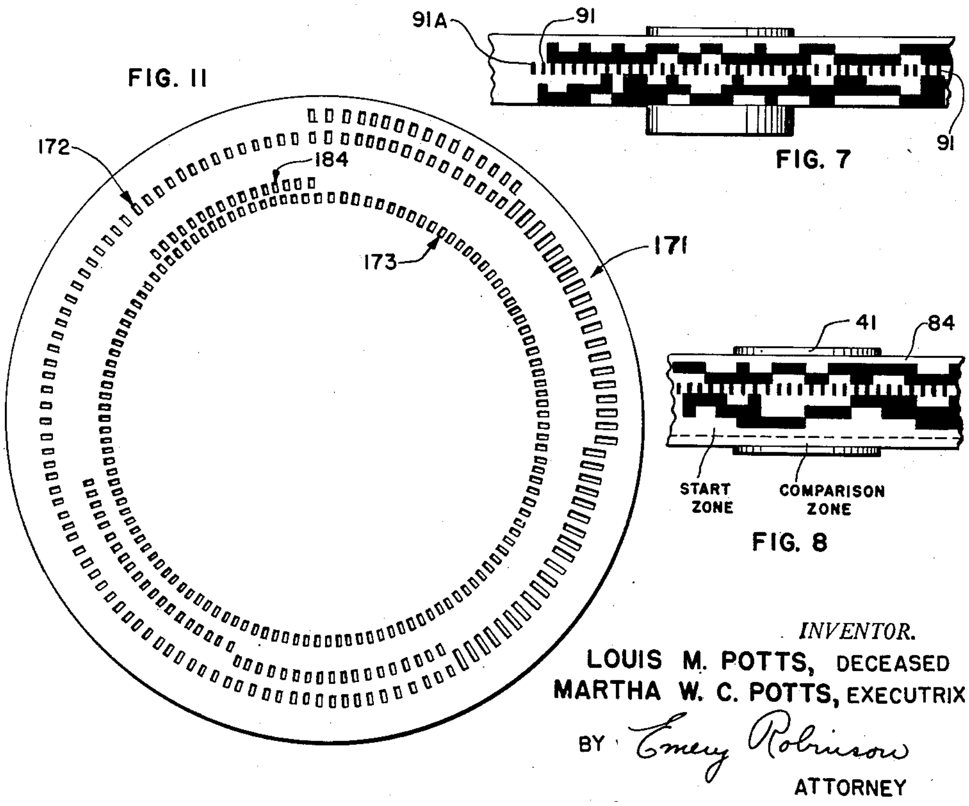
Figs. 7 and 8 show portions of two different width indicia records which may be utilized in the apparatus.
Fig. 11 is a different type of scanning disc which may be utilized in the apparatus.

As has been mentioned many times, hereinbefore, the apparatus operates from a tape, such as tape 84 illustrated in Figs. 5, 6, and 8. This tape is provided with eight separate zones extending transversely thereacross, one corresponding to a feed zone, five corresponding to impulse zones of a five unit code, the seventh corresponding to a start impulse interval and the eighth corresponding to a comparison zone, the utility of which will be described more fully hereinafter. It should be noted, however, that it is possible to use a tape such as illustrated in Fig. 7 wherein six zones only are provided and which correspond to a feed zone and the five impulse zones of the five unit Baudot code. As will be described hereinafter in the event that a tape is used such as illustrated in Fig. 7, a portion of the feed roll 41 will also be scanned to provide the difference of the seventh and eighth zones, as mentioned with respect to tape 84.

It should also be noted that mention has been made of a comparison zone with the remark that such would be described more fully hereinafter. The use of such a comparison zone is for use in one embodiment of an electrical circuit, namely that shown in Fig. 12, and will be described at the time of description of that figure. The electrical circuit illustrated in Fig. 10 operates from the scanning of the various zones described above but with an omission of the use of a comparison zone, as also will be described at the time of discussion of Fig. 10.

As was also previously mentioned the shaft 14 was provided with a pair of cams 19 and 21. The two cams 19 and 21 are provided with cam followers 86 and 87, respectively, which are pivotally mounted on a common shaft 88, Figs. 2 and 3, and which have extending portions which control contact pile-ups such as indicated generally as 89 in Fig. 1. The contact pile-ups will be described more fully at the time of discussion of the electrical circuit and so it is only deemed necessary at this point to mention that at such time as the high portion of either of cams 19 or 21 engage the associated cam follower levers 86 and 87, respectively, such levers will be operated to result in pressure being applied to the associated contact pile-up such as 89, with the resultant opening or closure of individual contacts therein.

The above description has indicated specifically the various elements forming the present invention with the exception that no mention has been made of the particular electrical circuits utilized. It is deemed desirable, however, prior to a description of the particular electrical circuit and the operation thereof to describe the operational details of the mechanical elements as set forth hereinbefore. During such description it is to be remembered, as has also been brought forth previously, that the shaft 14, and thus the cams 19 and 21, and the scanning disc 23, will be constantly rotating as will be feed roll 41. It should be remembered, however, also as previously described, that even though the feed roll 41 rotates continuously the tape passing thereover is not moved continuously but instead is only moved at such time as the pressure roll 68, Fig. 1, is pressed into engagement with the feed roll 41 through the energization of the magnet 66.

However, assuming that the tape 84 is in position on the tape roll 41, such as is shown in Fig. 5, with the shutter 74 in its normal or extreme clockwise position, the light from the light source 42 will be directed to the scanning point, as defined by the slot 73 in the light shield 72 and therethrough against a transverse portion of the tape 84 corresponding to a single code signal. It should be noted by referring to the code marks on the tape and the shutter 74 that in the position shown in Fig. 5, the lug 78 will prevent the scanning of the code marks 91 which are indicative of tape feed control marks. Thus, as the light is reflected or not reflected from the five code zones, the start zone and the comparison zone through the optical arrangement 47 and the prism 58, light will be directed through the slot 59 in the plate 13 to the scanning disc 23 in accordance with the code combination printed on the tape 84. It should be noted at this time that even though there is a reflection of the entire five code impulse intervals and the start and comparison zones through the opening 59 in the plate 13, all will not be reflected through the scanning disc 23 to the photocell 61 at the same time because the disc, Fig. 2, is provided with transparent portions or slots 26 to 29, inclusive, and 31 to 33, inclusive, as has been previously described. Thus, even though the light for the entire code signal is reflected to the disc 23, it will be broken by the disc so that at the time the transparent portion 27 passes the opening 59 the photocell 61 will be activated in accordance with the code combination on the tape 84 for the No. 1 impulse only. As the disc 23 rotates further and the various other transparent portions pass the slot 59, the other code signals will cause the photocell 61 to be activated in accordance with whether they are of a marking or spacing nature, i. e., whether there in a black or white code spot on the tape 84 at that particular point. It should be remembered that it was mentioned that the circuit disclosed in Fig. 10 did not depend on the use of a comparison zone and as the scanning disc illustrated in Fig. 2 is for utilization of the electrical circuit, Fig. 10, no provision is made for the scanning of a comparison zone. The use of the comparison zone will be described in the description of the scanning dics illustrated in Fig. 11 and the electrical circuit utilized therewith of Fig. 12. Thus, for this adaptation the tape may omit the comparison zone completely.

During the scanning which is described for the disc 23, it should be remembered that the lug 78 of the shutter 74 precluded any scanning of the zone on the tape 84 corresponding to the feed marks 91. It is desirable to mention at this point that the lug 78 should be provided with a black surface so that when a feed mark 91 is covered by the lug 78 light will not be reflected through the feed scanning zone 29 of the scanning disc 23. The utility disc 23. The utility for such will be understood with respect to a discussion of the electrical circuit utilized in the apparatus.

Assuming now that the magnet 83 has been energized causing the shutter 74 to move to the position shown in Fig. 6, it should be noted that the shutter 74 now prevents the scanning of the tape portion corresponding to the code impulses because the metal portion of the shutter has closed over the opening 73 in the light shield 72 or if no light shield is provided, has blocked scanning of the tape at the scanning point. However, in the position shown in Fig. 6, the openings 77 and 76 of the shutter 74 do allow portions of the tape 84 to be scanned which correspond to the feed marks 91 and the start and comparison zones illustrated at the right-hand margin of the tape 84 in Figs. 5 and 6, as indicated in Fig. 8. Thus, under this condition the scanning disc 23 will only be able to activate the photocell 61 in accordance with the feed marks 91 and the start impulse in the scanning disc used in Fig. 2 or the feed mark, start zone and comparison zone if the scanning disc of Fig. 11 is utilized.

Thus, it has been seen that the photocell 61 will be activated in accordance with the various code impulses of a five unit start-stop code in accordance with whether they are marking or spacing and also will provide the scanning and the inclusion of a start interval. If reference is made to Fig. 2 it may be seen that there is no transparent portion in a separate zone between the zones 26 and 33 of the scanning disc 23. Such is provided to produce a stop impulse interval in the start-stop telegraph code as will become apparent from the description of the electrical circuit accompanying the apparatus.

As the operation of the mechanical elements have been described above in order to illustrate how the tape is scanned to transfer from black and white portions thereof a limited or greater activation of the photocell 61 respectively, it is not believed necessary to further mention the mechanical details but instead to now describe the electrical circuit utilized in the present apparatus and the actual transmission of the scanned code signals over a signaling channel. It is, of course, obvious that further description of mechanical parts will be made where necessary to the operation of the electrical circuit.

It should be noted with respect to the tape used, such as 84, that the provision of code marks on the tape corresponding to the five code impulse intervals is not new, the mechanism for the preparation of such a tape being described in U. S. Patent No. 2,284,679, issued on June 2, 1942, to L. M. Potts. Further, the necessary mechanism for modifying the just described patent to include a tape feed print mark was described in U. S. Patent No. 2,397,202, issued on March 26, 1946, to L. M. Potts. Both of these patents are incorporated herein to the extent of the preparation of tape necessary for the operation of the present apparatus.

Figure 10:
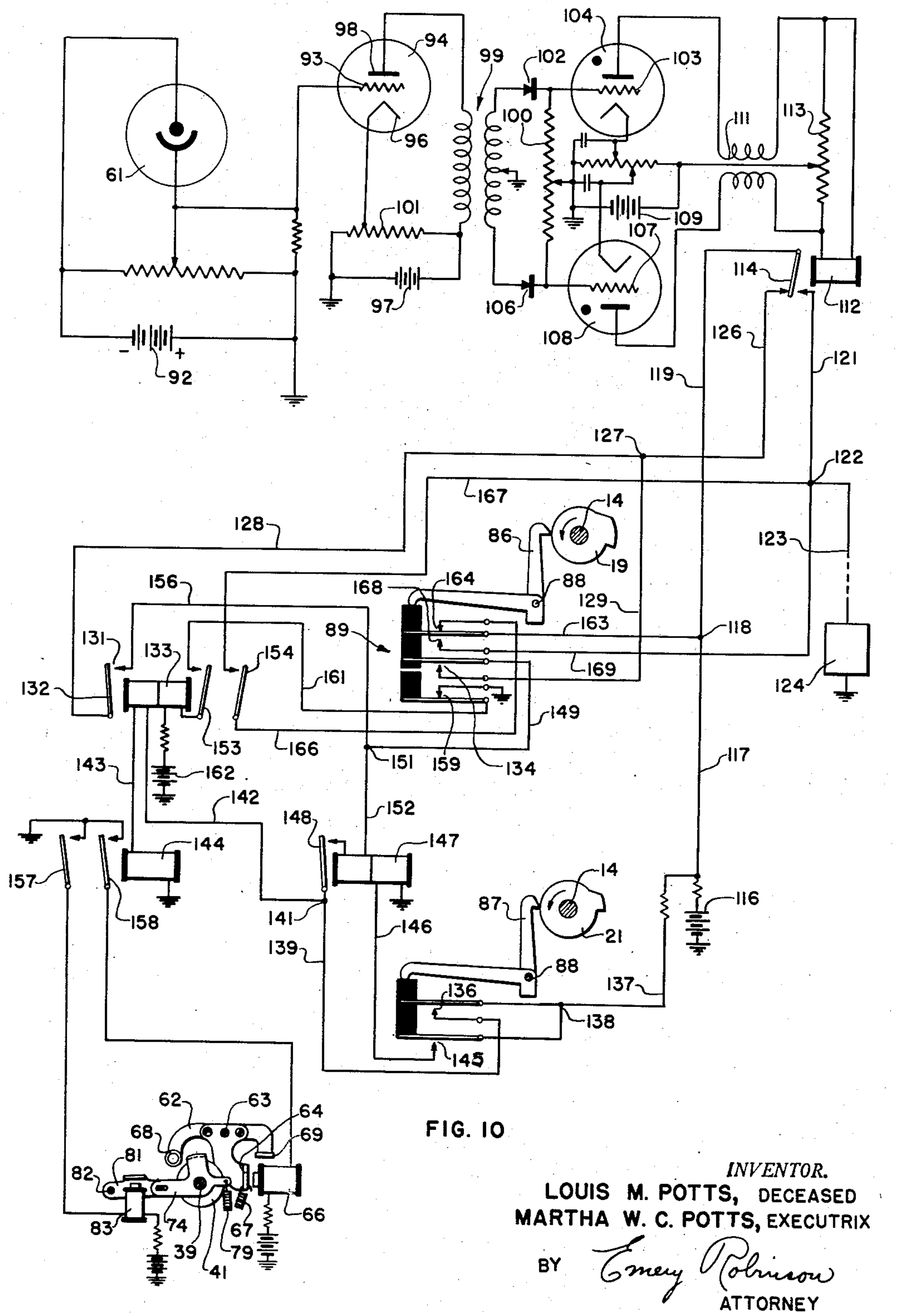
Fig. 10 is a schematic electrical circuit of the transmitter, showing certain of the mechanical elements diagrammatically.

The electrical circuit for utilization with the scanning disc 23 illustrated in Fig. 2 is disclosed fully in Fig. 10 and will be now described, the various circuits being traced as the necessity arises.

Generally, the circuit utilizes the multiplier photocell 61, previously described, which will be activated in accordance with the operation of the scanning disc 23, also as described. It should be noted that the present photocell 61 is responsive to reflected light and will be fully activated when a white zone is being scanned and will be less activated when a black zone is being scanned. The operation of the present circuit depends, as will be described, on the changes from white to black or black to white scanning.

Specifically, the photocell 61, which operates in a manner well known in the art, receives potential from a battery 92 and has its output circuit connected to the grid 93 of an amplifier vacuum tube 94. The cathode 96 of the tube 94 receives biasing potential from a battery 97, the anode 98 being connected to the battery through the primary of a transformer indicated generally by the numeral 99.

Describing the operation of the photocell and amplifier tubes, as a white portion of tape is being scanned, the phototube 61 will be activated to a large extent, resulting in a conducting circuit from battery 92, which results in the grid 93 of the amplifier tube 94 being biased negatively with respect to the cathode 96. As a result of such potential difference, the tube 94 will not conduct at this time. Conversely to the above description, if the scanning disc 23 is scanning a black portion of tape 84, the photocell 61 will not be activated greatly, resulting in a less negative potential on the grid 93 of the tube 94 thus allowing the tube 94 to become conducting. It will be understood by those skilled in the art that when a steady state condition of current is reached in the primary of transformer 99 such as caused by either a black or white area being scanned, the voltage induced in the secondary of transformer 99 drops to zero. However, the change in primary current occasioned by a transition from white to black or vice versa induces a transient voltage in the secondary, which has a polarity depending upon the relative direction of the primary and secondary windings of the transformer 99. The secondary terminals are so poled that a positive pulse appears on a rectifier 106 on a black to white scanning transition, and on a rectifier 102 on a white to black scanning transition.

The secondary of the transformer 99 is grounded at its midpoint and is connected through the rectifier 102 to a grid 103 of a gas tube 104. The opposite side of the secondary of the transformer 99 is connected through the rectifier 106 to a grid 107 of a gas tube 108. The rectifiers 102 and 106 deliver the positive pulses to the grids 103 and 107, respectively, when a transition causes an impulse to either of the rectifiers.

The rectifiers 102 and 106 are so poled as to conduct positive pulses and to reject negative pulses from the grids 103 and 107.

An equalizing potentiometer 100 is provided for equalizing grid voltage pulse amplitudes on the grids 103 and 107, and a return path to ground. The grids 103 and 107 are initially biased negatively with respect to their associated cathodes by means of a positive voltage applied to the individual cathodes from the battery 109 through the cathode biasing potentiometer 100 adjustable to the optimum value for stable operation of thyratrons. It may be noted that the grid 107 is biased higher than the grid 103 to preclude the tube 108 from firing initially, and to permit the tube 104 to conduct upon application of anode voltage. It will be understood that sufficient time delay may be introduced to allow the grid potentials to reach the correct value prior to application of anode voltage, by any of the means well known in the art.

The gas tubes 104, 108 are arranged in push-pull relation, both deriving operating potential from a battery 109. The anodes of the two tubes 104 and 108 are connected with a commutating transformer 111 therebteween so that upon one of the tubes becoming conducting, bucking current will be set up in the commutating transformer, which serves to reduce the anode potential of the opposite tube to a sufficiently low value to cause that tube to be extinguished. The use of such push-pull relation tubes and commutating effect therebetween is not new but is known in the art.

The output circuit of the tube 104 passes through the commutating transformer 111, through the winding of a relay 112 and back to battery 109 through an adjustable tap of a potentiometer 113.

It is believed feasible to describe the remainder of the circuit of Fig. 10 in the description of the operation of the entire system, rather than detailedly, as has been done above.

As an assumption is made that the apparatus is in a nonoperating condition and that a switch, not shown, is moved to its "on" position, the apparatus will be started into operation. Such initiation of operation will result in the starting of the motor to drive the scanning disc 23 and feed roll 41 and, although not shown, includes the biasing of the grid 103 of the tube 104 to a sufficiently low value to allow the tube to become conducting. Such initiation of operation of a tube is not new in the art but may be seen by reference to copending application Serial No. 596,295, filed on May 28, 1945, in the name of T. A. Hanson, wherein such occurs to initiate operation of an electronic distributor.

As a result of tube 104 becoming conducting (and because it is a gas tube, it will continue to conduct), and due to the increased current through the cathode resistor the bias voltage is increased to a point where if the tube 104 is extinguished by the firing of the tube 108 it will not immediately refire spontaneously, but will fire only in response to a positive pulse received on the grid 103. A circuit is established which may be traced from the anode of the tube 104, through one winding of the commutating transformer 111, through the winding of the relay 112, through the potentiometer 113 and to the cathode circuit and battery 109. Relay 112 will energize.

As the result of the energization of relay 112 and the subsequent attraction of its armature 114, a circuit is established which may be traced from grounded battery 116, over a conductor 117 to junction point 118, over a conductor 119, through the attracted armature 114, over a conductor 121 to junction point 122 and thence over a signaling channel 123 to a remotely located receiver 124 of any desired type. Under this condition, there is established the well known "marking on the line" condition, which is used normally in telegraph practice when no code signals are being transmitted to hold the start-stop receiver 124 in an unoperated condition.

During this time the scanning disc 23 will be operating, but inasmuch as the portion underlying the tape of the feed roll 41 is painted black and thus will not reflect light, there are no impulses in the transformer 99 as a result of a transition from white to black or black to white. It should also be noted that under this condition the lever 62 will be in its normal, unoperated position biased by its spring 67 to cause the brake shoe 69 to engage the plate 71 with the pressure roll 68 not in tape feeding engagement with the feed roll 41; also, the shutter 74 will be in its normal, unoperated position biased by its spring 79 to allow reflection of the code impulses through the slot 73 as shown in Fig. 5. However, as no tape is in the apparatus at this time and as the feed roll 41 is black, as previously mentioned, nothing will occur other than as described.

If it is now assumed that a piece of tape is placed in the apparatus, which has a white portion at the start thereof, the resulting transition of a scanning from black to white will result, as previously described, in the tube 108 becoming conducting and extinguishing the tube 104 through the commutating transformer 111. The effect of tube 108 becoming conducting is only to extinguish the tube 104, which results in the circuit previously traced through the winding of relay 112 being broken and thus allowing the relay 112 to de-energize, with its armature 114 moving to its unattracted position.

Immediately upon the armature 114 moving to its unattracted position, a circuit is conditioned partly which may be traced from grounded battery 116, over the conductor 117 to junction point 118, over the conductor 119, through the unattracted armature 114, over a conductor 126 to junction point 127, and thence over either of conductors 128 or 129 to the open contact 131 at unattracted armature 132 of a relay 133 or to the open contact pair 134. Thus, no circuit is actually established at this time.

At such time, however, as the shaft 14 is advanced to a point coinciding to a stop impulse condition the cams 19 and 21 will be positioned with their high portions urging their associated follower levers 86 and 87 in counterclockwise directions, respectively, about the shaft 88.

A result of such movement to the follower 87 results in a contact pair 136 being closed, thereby establishing a circuit from grounded battery 116, over a conductor 137 to junction point 138, through the closed contact pair 136, over a conductor 139 to a junction point 141, over a conductor 142, through the left-hand winding of the relay 133, over a conductor 143 and through the winding of a relay 144 to ground. The relays 133 and 144 will both energize.

Simultaneously, the follower 87 will also cause a contact pair 145 to be closed, establishing an electrical circuit from the battery 116, over the conductor 137 to the junction point 138, through the closed contact pair 145, over a conductor 146 and through the right-hand winding of a double wound relay 147 to ground. The relay 147 will energize and attract its armature 148.

At the same time the follower 86 will cause contact pair 134 to close, which allows the previously described conditioned circuit to conductor 129 to be extended through the closed contact pair 134, over a conductor 149 to junction point 151, over a conductor 152, through the left-hand winding of the relay 147, through the attracted armature 148 to junction point 141 and thence over conductor 142, through the left-hand winding of the relay 133 and over the conductor 143, through the winding of relay 144 to ground. However, relays 133 and 144 are already energized.

The energization of the relay 133 results in an attraction of its armatures 132, 153 and 154. The attraction of the armature 132 completes the previously described conditioned circuit, extending it from the conductor 128, through the armature 132, through the contact 131, and thence over a conductor 156 to junction point 151, from whence relays 133 and 144 are energized, all as described through the closure of contact pair 134. As the two relays 133 and 144 are already energized this has no effect at this time. The result of the attraction of the armatures 153 and 154 will be described hereinafter.

It might also be noted that even though the contact pair 145 is opened shortly after its closure, the relay 147 will not de-energize at this time as it is held energized by the circuit traced through the attracted armature 132 and its left-hand winding. Thus, as long as the armature 114 remains in its unattracted position and the relay 133 remains energized the relay 147 will likewise remain energized.

As a result of the energization of the relay 144 its armatures 157 and 158 will be attracted thereto, resulting in ground being supplied through the two armatures and over obvious circuits through the windings of the magnets 66 and 83 to separate grounded batteries.

As a result of the energization of the magnet 83 its armature lever 81 will be attracted thereto rotating about pivot point 82 in a clockwise direction and rotating the shutter 74 in a counterclockwise direction against the urging of spring 79 to its operated position, as illustrated in Fig. 6. The result of such movement to the shutter 74 is to allow the middle portion thereof to block the code impulse scanning but to allow scanning through the openings 76 and 77 of the start zone and feed marks, respectively.

As a result of the energization of the magnet 66 its armature lever 62 will be attracted thereto, resulting in the brake shoe 69 being removed from engagement with the tape 84 overlying it, and with the pressure roll 68 being brought into engagement with the constantly rotating feed roll 41, thereby causing the tape 84 to be fed forwardly with a speed commensurate with the rotation of the feed roll 41.

During the above interval of continuous movement of the tape, the scanning disc 23 continues to rotate. However, as the code impulse zone may not be scanned at this time because of the operation of the shutter 74 there will be no change to the phototube 61 which might cause a reoperation of the tube 104. During this time, however, the start and feed positions are being scanned, but inasmuch as both of these are white portions, this has no effect on the tube 61 which might tend to cause a transition. It might be noted also that the disc 23 is not provided with any transparent opening which would be utilized with the stop interval in the telegraph transmission. However, even though, as the disc 23 rotates, this portion is presented to the slot 59, the photocell 61 is not affected to cause the tube 104 to become conducting because the transparent portion 29 of the disc 23 is scanning a white surface in the feed mark position of the tape. It might also be noted that the tape zone assigned to the start impulse is always white.

In the following description which includes an explanation of the various results of a black feed mark 91 being presented to the scanning mechanism, it is to be noted that the tape 84 is provided with a feed mark 91A, Fig. 7, which occurs in a transverse line of the tape prior to the line of markings of the first code impulse. Such a mark is necessary for the proper operation of the apparatus as will become apparent hereinafter.

The printing of such a feed mark may be done by slightly altering the operating mechanism of the above-described two patents to L. M. Potts so that two feed marks are printed every revolution rather than a single feed mark, one being printed prior to any code printing. Thereafter, even though two code marks are printed every time, one will merely be on top of the preceding one and thus will not have any further effect on the tape printing or operation of the present invention.

The operation of the cams 19 and 21 and the resultant pivotal movement to their respective armatures 86 and 87 has been touched on briefly, but it is deemed pertinent to describe their operation now more in detail and reiterate such operation when it affects various circuits. Accordingly, referring to Fig. 9, wherein a timing chart is disclosed, it may be seen that the intervals have been divided according to the standard start-stop code transmission wherein there is a stop interval, a start interval, and the five code intervals 1 to 5, respectively. Thereafter, of course, the same sequence is continued until such time as transmission ceases. Accordingly, and inasmuch as shaft 14 rotates continuously, every time that the scanning disc 23 arrives at the stop interval the high portion of the cam 19 will engage the follower 86 causing it to be pivoted in a counterclockwise direction, Fig. 10, which moves the contact pile-up 89 in a downward direction thereby altering certain electrical circuits, as will be described.

Inasmuch as the relay 133 has been described as being energized through its left-hand winding, its armatures 153 and 154 will be in an attracted position. This resulted due to the operation of cams 19 and 21, as just described, and results in an electrical circuit being established which may be traced from ground, through a closed contact pair 159, over a conductor 161, through attracted armature 153, and through the right-hand winding of relay 133 to grounded battery 162. However, inasmuch as relay 133 was already energized, this locking circuit had no effect thereon. Also, prior to the just described operation of cam 19, a second electrical circuit was established which may be traced from grounded battery 116, over conductor 117 to the junction point 118, over a conductor 163, through a closed contact pair 164, over a conductor 166, through the attracted armature 154, over a conductor 167 to the junction point 122, and thence over the signaling channel 123 to the remotely located station 124. Thus, a marking on the line condition is still retained over the signaling channel 123 even though the relay 112 was deenergized at the time tape was inserted on the feed roll with the subsequent action of the armature 114 moving to its unattracted position. Thus, the instant circuit also has no operating effect at this time.

Referring again to the operation of the cam 19 causing the follower 86 to be rotated in a counterclockwise direction, the contact pair 159 will be opened and ground will no longer be supplied to complete a circuit through the right-hand winding of the relay 133 to grounded battery 162. However, despite the removal of locking battery from the relay 133, the relay still remains energized through its left-hand winding because of the previously traced circuits.

A second circuit is also affected at this time, namely, the circuit which previously had been traced through the closed contact pair 164 and attracted armature 154 to apply marking battery to the line. However, upon the opening of contact pair 159, a contact pair 168 will be closed which will establish a circuit which may be traced from grounded battery 116, over the conductor 117 to junction point 118, over the conductor 163, through the now closed contact pair 168, over a conductor 169 to junction point 122, and thence over the signaling channel 123 to the remotely located station 124. Thus, a marking condition still exists on the line.

As the shaft 14 further rotates and as it gets to a position near the end of the stop impulse interval, the cam 21 will no longer present its high portion to the follower 87, allowing the follower to move to a clockwise position whereat the contact pair 136 will open. Upon such occurrence the circuit traced previously from battery 116 and over the conductors 137, 139, and 142 for energizing relays 133 and 144 will be broken. However, as the relay 133 is locked up through attracted armature 132 from armature 114 and also through contact pair 134, the relays 133 and 144 will remain energized at this time.

Figure 9:
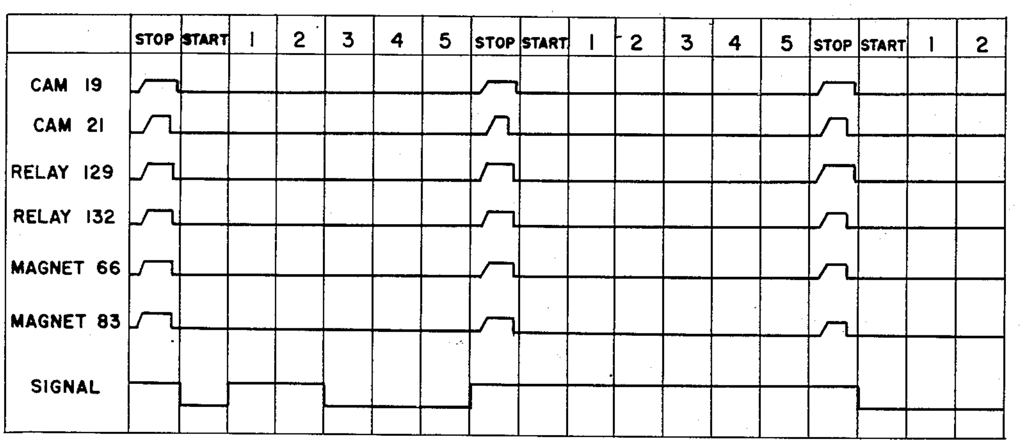
Fig. 9 is a timing diagram showing the operational relation between certain of the elements and the code signal intervals.

Shortly thereafter, as may be seen in the timing chart, Fig. 9, the cam 19 will remove its high portion from the follower 86, allowing the follower to regain its clockwise position. At this time the contact pile-up 89 will regain its unoperated condition, causing several circuits to be altered.

The first circuit to consider will be that controlled by opening of contact pair 168 and the closing of contact pair 164. Such contact pair changes result in battery on the line 123 no longer being supplied directly over the conductor 169, but instead through the armature 154, all as described originally.

It should be noted that the contact operator under the control of the follower 86 is not a continuous element, but that a space exists between the section controlling the upper two contact tongues and the lower contact tongue. The reason for such construction is to allow the contact pair 159 to close prior to the opening of contact pair 134.

As the contact pair 159 closes thusly, ground is once again supplied over the conductor 161 and through the attracted armatures 153 (relay 133 still energized through closed contact pair 134) to complete a locking circuit for the relay 133. Thus, even though the contact pair 134 now opens, a circuit is still established at the armature 132 for supplying battery 116 through unattracted armature 114 for the left-hand winding of the relay 133 and the relay 144. Thus, the relay 144 remains energized.

The operation of the scanning disc 23 will continue as described above with the cams 19 and 21 operating to make and break the described circuits each time the disc passes the stop impulse portion, with the same effects as described Assuming now, however, that the tape 84 has reached a position whereat the initial black feed mark 91A is scanned by the feed scanning portion 29 of the disc 23, a condition will exist wherein there is a change from the white tape to the black feed mark which causes the photocell 61 to be less activated because of the lesser amount of light reaching its plate. In accordance wtih the previously described circuits, the tube 94 will conduct, the tube 104 will conduct due to the impulse at its grid 103 resulting from the transition from white to black scanning, causing the previously described circuit to be established for the energization of the relay 112. Accompanying this will be the extinguishing of the tube 108 through the commutating transformer 111, all as described.

Upon the relay 112 now becoming energized with the subsequent attraction of its armature 114, the circuit will be broken which previously had been established over the conductors 126, 128, 156, 152, armature 148, and conductor 142 to the left-hand winding of the relay 133, over the conductor 143 and through the winding of the relay 144. At this time the relay 133 will not become de-energized because the disc 23 having moved from the stop portion, the contact pair 159 once again closed to supply locking battery for the relay 133 through the right-hand winding thereof. With respect to relay 144, however, which is not supplied with any locking battery, this relay will de-energize and accordingly allow the armatures 157 and 158 to move to their unattracted positions. The result of such movement of armatures 157 and 158 is to immediately break the previously described energizing circuits for the magnets 83 and 66. Upon magnet 66 becoming de-energized, the pivotally mounted lever 62 is allowed to resume its normal unoperated position under the urging of spring 67, thereby removing the pressure roll 68 from the tape feed position and instead placing the brake shoe 69 in engagement with the tape, thus holding the tape in a stationary or stop position. The de-energization of the magnet 83 results in its armature lever 81 no longer being attracted, thereby allowing the spring 79 to urge the shutter 74 to its unoperated clockwise position, such as is illustrated in Fig. 5. As a result of this latter operation the tape feed marks 91 will no longer be scanned because the opening 77 in the shutter 74 will be moved out of alignment therewith and the lug 78 will prevent their being scanned but the code marks are now visible for scanning through the slot 73, all as shown in Fig. 5. The armature 114 will now remain in its attracted position due to the continued energization of the relay 112 because as the tube 104 is of a gas variety it will continue to remain conducting until extinguished by a succeeding operation of the tube 108.

It should be noted that even though a code mark might be now scanned which would cause a transition, resulting in the relay 114 being de-energized, all as described, the circuit no longer may be established for the re-energization of the relay 144 at this time over the circuit traced previously through the armature 143 of the relay 147, for at the time the armature 114 moved to its attracted position battery was removed from the left-hand winding of the relay 147, thereby causing this relay to de-energize.

As the scanning disc 23 now moves around to a position whereat its stop interval would be scanned, the cam 19 will operate as previously described to cause the setting up and breaking of various of the circuits. Locking battery will be removed from the right-hand winding of the relay 133 which will not affect the relay because the cam 21 will have caused the contact pair 136 to be closed, all as previously described. Likewise, the contact pair 145 will again be closed to cause energization of the relay 147.

Also, as described, the contact pair 136 will be closed resulting in the relay 144 becoming energized. In this case, however, the relay will not remain energized but only for a period equal to the length of closure of the contact pair 136 under control of the high portion of the cam 21. Such occurrence causes once again the tape feed lever 62 to be moved to its operated position with a similar movement to the shutter 74, thus allowing the tape to be further fed and the feed marks to be scanned.

It should be noted that the contact pair 136 remains closed a sufficient period of time to allow the tape to be moved far enough so that the black feed spot will no longer be scanned but instead the white tape will be presented to the scanning mechanism. Such movement once again causes the tube 108 to become conducting as described, resulting in the armature 114 moving to its unattracted position thereby completing the circuit from battery 116, through the left-hand winding of the relay 133 and the winding of the relay 144. Therefore, at such time as the contact pair 136 once again opens, a circuit is still established to hold the relay 144, and thus the magnets 66 and 83, in their energized positions.

Upon the next black tape feed mark being presented to the scanning mechanism which will be prior to cam 19 releasing follower 86, the circuits will be established again as described to release the tape feed lever 62 to its unoperated position and allow the shutter once again to open to allow code mark scanning and prevent feed mark scanning.

Inasmuch as the succeeding black code mark is scanned after the contact pair 136 is opened but prior to the release of the follower 86, and as the relay 112 will energize and attract its armature at this time, no circuit will be established for the relay 144 at this time, the relay 147 de-energizing as described above. Also, upon the armature 114 being attracted no circuit may be traced through closed contact pair 134 for the energization of the relay 133, and as the locking circuit is open at contact pair 159 the relay 133 will de-energize. Marking on the line 123 will exist at this time through the closed contact pair 168.

As the cam 19 thereafter releases the follower 86 the closure of the locking circuit at contact pair 159 will have no effect as armature 153 is in the unattracted position. Also, the opening of the contact pair 168 will remove marking battery from the line 123, which will not be replaced by the closure of the contact pair 164 as the armature 154 is in the unattracted position.

As the disc 23 rotates further, the start portion indicated by 26 will be advanced to scanning position which will result in a white surface of the tape being scanned, the start portion always being white as described, and further increase activation of the photocell 61 to cause the tube 108 now to become conducting, causing the relay 112 to de-energize, all as described. Thus, the armature 154 is not attracted and, therefore, no marking on the line circuit can be traced through the contact pair 164. Therefore, as described above, as the start interval is scanned and the armature 114 moved to its unoperated position, no battery at all will be provided for the signal channel 123 from any circuit, thereby resulting in a spacing condition existing on the line to condition the recording apparatus at the remotely located station 124.

The disc 23 will then scan successively the five impulse intervals determining whether a black, marking condition or white, spacing condition exists and conditioning the signal channel 123, accordingly, under the control of the interpretation of the photocell 61 and the operation of one or the other of the gas tubes 104 and 108.

The tape will continue to step in a normal cadence every time the disc 23 makes a complete revolution, all as has been described above. It should be noted, however, that the black portion of the disc assigned to the stop interval (between the interval portions 33 and 26 on the disc 23) invariably transmits a stop impulse because such portion results in the scanning of a black mark and either causes the tube 104 to become conducting, or has no effect after this tube is already conducting, thereby allowing battery 116 to be supplied through the attracted armature 114 to the signal channel 123. During the automatic insertion of the stop impulse, the single photocell is utilized to scan the tape feed marks as has been described fully hereinbefore.

At such time as the last feed mark has been scanned on the tape indicating that no more code marks are available for scanning, the transition from black to white causes the tube 108 to become conducting, the relay 112 to de-energize, and the armature 114 to move to its unattracted position. Such, of course, is conditioned by the cam 21 causing the contact pair 136 to be closed during the stop impulse after the last code signal is transmitted. Such results in the energization of the relay 144 and of magnets 66 and 83, all as initially described and as there are no further code marks, the tape feed will continue to operate until such time as the tape is fed out completely from between the rolls 68 and 41.

At the above time or after the tape leaves the scanning position the black feed roll will now be scanned causing the tube 104 to become conducting by the transition from white to black scanning, energizing the relay 112 and attracting the armature 114. Continuous marking battery will now be applied to the signaling channel 123 and the tape feed and shutter mechanism will be allowed to resume their normal unoperated position under the control of their respective springs 67 and 79.

As mentioned earlier a second type of scanning disc may be utilized in the apparatus, such as disclosed in Fig. 11. Also, as initially stated, a different electrical circuit will be necessary with such a disc, such circuit being illustrated in Fig. 12. Referring now to Fig. 11, the disc is indicated by the numeral 171 and is provided with a plurality of impulse zones similar to those as described with respect to Fig. 2. However, in this case the various zones are formed of alternating transparent and opaque portions. The instant disc may be formed of metal with the transparent portions of each zone being formed by perforations of transparent portions therein or the disc may be transparent with the opaque portions being formed by some material to render them such. In the following description it will be assumed that the disc 171 is metal with the various zones being formed by perforations or transparent portions.

As was described with the disc 23, the disc 171 is formed with a black stop portion, an alternating and opaque and transparent start portion, and similar alternating and opaque portions provided for the five impulse positions. An alternating opaque and transparent tape feed portion 172 is provided which is continuous through the 360° of the disc 171 and a comparison portion 173 is provided which is also formed of alternating opaque and transparent portions through the 360° of the disc. However, with respect to the comparison portion 173, the two portions are exactly opposite as with respect to the start, code and tape feed scanning portions; that is, a transparent portion is opposite an opaque portion in the other portions and vice versa.

It is in the instant embodiment that it is necessary to utilize a comparison zone, as has been previously mentioned. Actually, the alternating opaque and transparent spots amount to a light chopping disc so that a different electrical circuit may be utilized for the apparatus.

Figure 12:
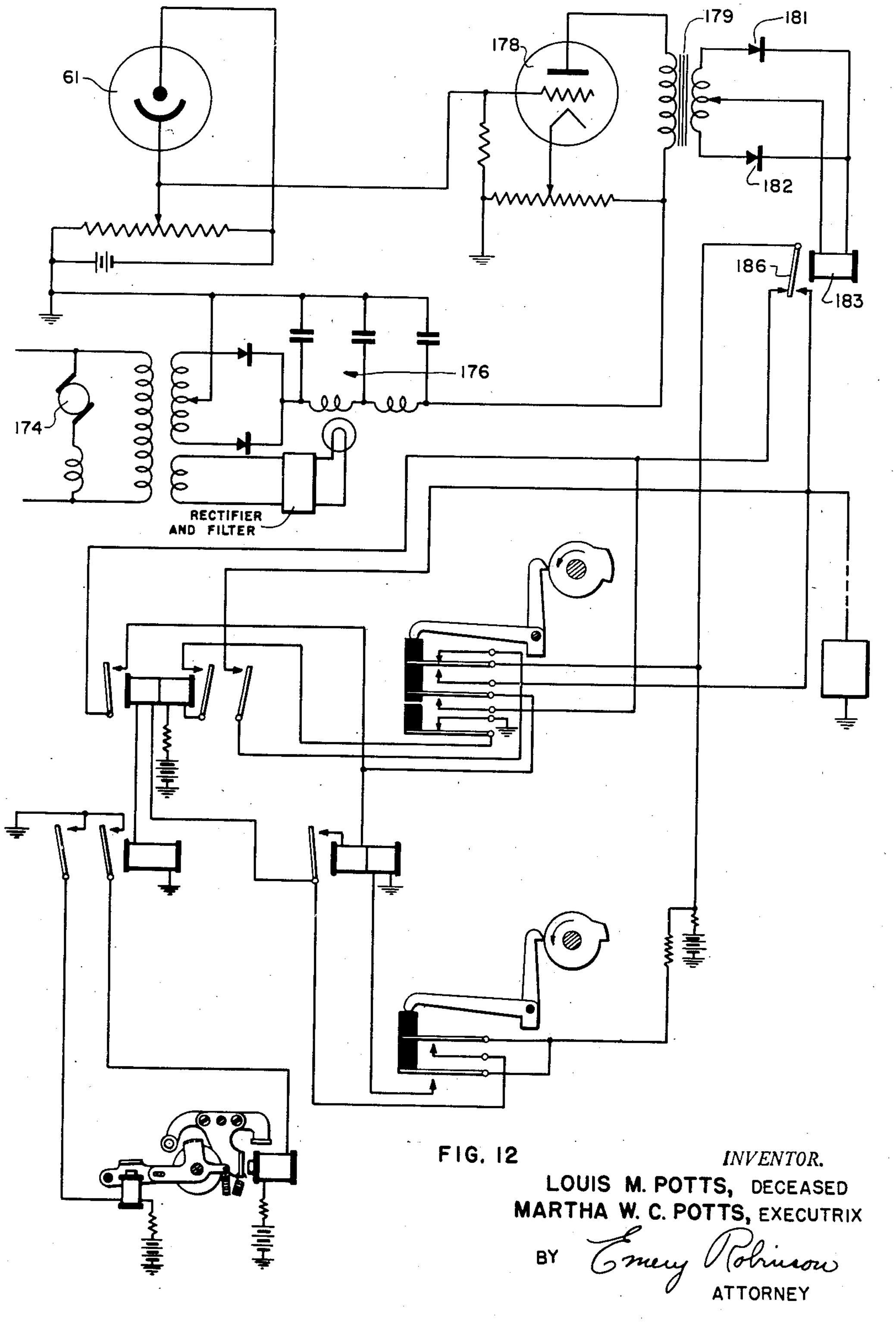
Fig. 12 is a schematic electrical circuit similar to Fig. 10 but which is utilized with the scanning disc shown in Fig. 11.

Referring now to Fig. 12, the electrical circuit utilized with the scanning disc of Fig. 11, is disclosed. Inasmuch as many of the elements of Fig. 12 are similar to and operate similarly to those disclosed and described with respect to Fig. 10, similar identifying numerals will be used in Fig. 12 in all cases where possible.

A photocell 61 is provided which receives direct current from an alternating current source 174 after it passes through a rectifier identified generally by the numeral 176. The photocell 61 operates in the same manner as the previously described similarly numbered photocell, the difference being in the instant example when a white portion is being scanned by any one of the code portions or by the tape feed portion a similar white zone will be scanned by the comparison portion 173 thereby resulting in no current change in the cell 61. With no current change in the cell 61, no change will exist in the grid of the vacuum tube 178. At such time as the tube 178 is not conducting, no curent will pass through the primary of an output transformer 179, the secondary of which is connected through rectifiers 181 and 182 to the winding of a relay 183.

At such time as a black mark is being scanned by the code portions or tape feed portion of the disc 171, and at which time the comparison portion 173 will be scanning white, substantially all of the light reaching the photocell 61 will come from the comparison portion 173 and inasmuch as it is opposite to the other portion, an alternating current will be delivered to the amplifier tube 178 through the transformer 177. As a result of such current being supplied to the input circuit of the tube 178, it will become alternatingly conducting and nonconducting, resulting in an alternating current in the primary of the transformer 179. A similar current will be induced in the secondary of the transformer 179 which will pass through the rectifiers 181 and 182 and cause the energization of the relay 183. The relay 183 is sufficiently sluggish so as not to de-energize through rapid fluctuations of the tube 178.

Thus, it may be seen that with the circuit of Fig. 12, the relay 183 will be in an energized condition at such times as a black portion of the tape is being scanned and will be in a de-energized condition at such time as a white portion is being scanned, as interpreted conjointly by the comparison portion and in one of the code or tape feed portions.

It might be noted at this time that the stop portion of the disc is a continuous opaque portion and, therefore, the interpretation of the scanning between it and the comparison zone will always cause alternating current to be impressed and the relay 183 to be energized. Conversely, the start portion 184 of the disc 171 has alternating opaque and transparent portions in exact phase opposition to the comparison portion 173 and, therefore, every time that the start impulse is scanned a direct current will result, thereby causing the relay 183 to assume its de-energized condition.

The relay 183 controls an armature 186 which is similar to the armature 114 of the relay 112, all described in Fig. 10. Inasmuch as all of the remaining portions of the electrical circuit of Fig. 12 are similar and operate similarly to those described with respect to Fig. 10, there is no necessity for repeating either a description of the circuits or of the operation of the apparatus. It is believed that a full understanding of the circuit operation of Fig. 12 may be had by reference to the operation of Fig. 10, the upper portion of the circuit only being substituted for the upper portion of the circuit of Fig. 10.

If it is at all times desired to utilize a narrow tape such as illustrated in Fig. 7 which provides tape feed and code impulse zones only, as distinguished from the wider tape of Fig. 8 utilizing a start zone for Fig. 10 or a start and a comparison zone for Fig. 12, it is necessary only to provide a white surface on the tape feed roll 41 of a width equal to the two zones. Such is readily possible as both the start and comparison zones are always white, there being no black indicating marks appearing on them at all. Even though such a white portion indicated a comparison zone or portion it would not have any effect with the circuit of Fig. 10, as the scanning disc 23 is not provided with any portion to scan such a zone.

While a specific embodiment of the invention has been described fully and two alternate circuits have been disclosed, it is to be understood fully that the invention is not restricted to the specific elements illustrated and described but instead that these are illustrative only of an apparatus which might be constructed within the scope and spirit of the invention.

What is claimed is:

1. In a photoelectric transmitter, adapted to be controlled by a control form bearing permutation code indicia and form advancing indicia, form advancing means, and means for scanning said permutation code indicia while said form is stationary and for scanning said form advancing indicia while said form is advancing under the control of said form advancing means.

2. In a telegraph transmitter, adapted to be controlled by a tape having an initial blank portion followed by a portion bearing code indicia, code interpreting means, means to continuously advance said tape while said blank portion is presented to said code interpreting means, and means to intermittently advance said tape while said code indicia portion as distinguished from said initial blank portion is presented to said code interpreting means.

3. In a telegraph transmitter, adapted to be controlled with a record tape bearing tape feed control marks and permutation code signal marks, tape advancing means, means to scan both said tape feed control marks and said permutation code signal marks, means to continuously advance said tape in the absence of tape feed control marks under the control of said tape advancing means, and means to stop the advancement of said tape in the presence of tape feed control marks, said scanning means scanning said permutation code signal marks while said tape is stationary.

4. In a telegraph transmitter adapted to be controlled by a tape having an initial blank portion, followed by a portion bearing code indicia and having a terminating blank portion, code interpreting means, means to continuously advance said tape while said initial blank portion is presented to said code interpreting means, and means to intermittently advance said tape while said code indicia portion as distinguished from said blank portions is presented to said code interpreting means, said means to continuously advance said tape thereafter operating to continuously advance said tape while said terminating blank portion is presented to said code interpreting means.

5. In a photoelectric transmitter adapted to be controlled by material carrying groups of code marks and tape feed control marks, each group corresponding to a code signal, a continuously rotating scanning disc, intermittent material advancing means controlled by said scanning disc scanning the tape feed control marks, and means for causing said scanning disc to interpret said groups of code marks when said material is stationary only.

6. In a telegraph transmitter adapted to be controlled by a tape bearing feed control marks and code signal marks, a single means for scanning both said feed control marks and code signal marks, and means to prevent said scanning means from scanning said feed control marks while scanning said code signal marks and vice versa.

7. In a start-stop telegraph transmitter adapted to be controlled by a tape bearing feed control marks and code signal marks, means to scan said feed control marks and said code signal marks, means to transmit the scanning interpretation of said code signal marks, means to prevent the scanning of said code signal marks during the scanning of said tape feed control marks, and means for causing said transmitting means to transmit a stop impulse during the scanning of said feed control marks.

8. In a photoelectric transmitter adapted to be controlled by a tape bearing feed control marks and code signal marks, a constantly operating tape feed roll, scanning means for scanning said feed control marks and code signal marks, and means to preclude advancement of said tape by said tape feed roll during the scanning of said code signal marks by said scanning means and to advance said tape by said tape feed roll during the scanning of said feed control marks by said scanning means.

9. In a photoelectric transmitter adapted to be controlled by a tape having printed code signal marks and tape feed control marks, means including a scanning disc for scanning said printed code signal marks and tape feed control marks, means controlled by said scanning disc for retaining said tape in a stationary condition during the scanning of said code signal marks, and means controlled by said scanning disc under the control of said tape feed control marks for invariably initiating advancement of said tape after the scanning of said code signal marks.

10. In a photoelectric transmitter adapted to be controlled by a tape having groups of printed code marks and tape feed control marks, each group representing a character, means including a scanning disc for scanning said groups of code marks while said tape is in a stationary condition, means controlled by said scanning disc under the control of said tape feed marks for invariably initiating advancement of said tape after the scanning of a group of said code marks, and means controlled by said scanning disc for stopping the advancement of said tape upon the next of said group of code marks reaching the scanning position.

11. In a photoelectric transmitter adapted to be controlled by a tape bearing tape feed control marks and code signal marks, a single scanning means, a constantly rotating tape feed roll, a pressure roll for causing said tape to engage said feed roll for advancement, means to cause said pressure roll to engage said feed roll invariably after the scanning of said code marks to advance said tape, a tape stop brake, and means to cause said tape stop brake to engage said tape and said pressure roll to be released from engagement with said feed roll upon the scanning of the succeeding of said tape feed control marks.

12. In a photoelectric transmitter adapted to be controlled by a tape having a feed control zone, a code signal zone, a start impulse zone, and a comparison zone, a single means to scan all of said zones, and means to control the initiation of start-stop code signals and advancement of said tape by the conjoint scanning of all of said zones.

13. In a photoelectric start-stop transmitter adapted to be controlled by a tape bearing feed control marks, code signal marks and a start impulse zone, a single scanning means for scanning said feed control marks, code signal marks and start impulse zone, means to retain said tape in a stationary condition during the scanning of said code signals, means to invariably insert a stop impulse irrespective of said tape, and means to advance said tape during the scanning of said feed control marks and said start impulse zone.

14. In a photoelectric scanning device adapted to be controlled by a record form bearing form feed control marks and code signal marks, a scanning disc, record form advancing means, means for advancing said record form continuously under the control of said record form advancing means until a form feed control mark is scanned by said scanning disc, and means for thereafter holding the record form stationary for a predetermined interval, said scanning disc scanning the code signal marks on the record form during such interval.

15. In a photoelectric transmitter for generating start-stop telegraph signals and adapted to be controlled by a record form bearing start code marks, record feed marks and code signal marks, a scanning disc, means controlled by said scanning disc for generating the start code marks and the code signal marks through the scanning of the record form, means controlled by said scanning disc for generating stop impulses invariably and irrespective of the record form at predetermined intervals, and means controlled by said scanning disc for advancing the record form intermittently during the generation of the stop impulses and under the control of the scanning of said record control feed marks.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 2,177,077 | Potts | Oct. 29, 1939 |
| 2,183,559 | Green | Dec. 19, 1939 |
| 2,382,251 | Parker et al. | Aug. 14, 1945 |
| 2,397,202 | Potts | Mar. 26, 1946 |
| 2,455,443 | Sarnoff | Dec. 7, 1948 |
| 2,468,462 | Rea | Apr. 26, 1949 |

Certificate of Correction

Patent No. 2,565,266 August 21, 1951

LOUIS M. POTTS, Deceased,
by Martha W. C. Potts, Executrix

It is hereby certified that error appears in the printed specification of the above numbered patent requiring correction as follows:

Column 1, line 5, for "previously" read *previous*; column 4, line 41, for "dsc" read *disc*; column 7, line 43, strike out "The utility disc 23."; column 19, line 31, for "with" read *by*; column 21, line 21, after "record" insert *control*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*